(12) United States Patent
Regelmann (10) Patent No.: US 11,389,274 B2
(45) Date of Patent: Jul. 19, 2022

(54) ORTHODONTIC EXPANSION SCREW

(71) Applicant: Bernhard Foerster GmbH, Pforzheim (DE)

(72) Inventor: Michael Regelmann, Neulingen (DE)

(73) Assignee: Bernhard Foerster GmbH, Pforzheim (DE)

( * ) Notice: Subject to any disclaimer, the term of this patent is extended or adjusted under 35 U.S.C. 154(b) by 139 days.

(21) Appl. No.: 16/946,044

(22) Filed: Jun. 3, 2020

(65) Prior Publication Data

US 2020/0383755 A1  Dec. 10, 2020

(30) Foreign Application Priority Data

Jun. 4, 2019  (DE) ..................... 10 2019 115 019.1

(51) Int. Cl.
    *A61C 7/10*  (2006.01)
(52) U.S. Cl.
    CPC ..................... *A61C 7/10* (2013.01)
(58) Field of Classification Search
    CPC .......... A61B 17/7216; A61C 7/10; A61C 7/06
    USPC ....................................................... 433/21, 7
    See application file for complete search history.

(56) References Cited

U.S. PATENT DOCUMENTS

| | | | | |
|---|---|---|---|---|
| 5,281,133 A * | 1/1994 | Farzin-Nia | ............... | A61C 7/10 433/7 |
| 6,109,916 A * | 8/2000 | Wilcko | ..................... | A61C 7/10 433/24 |
| 6,309,213 B1 * | 10/2001 | Forster | ..................... | A61C 7/10 433/7 |
| 7,837,465 B2 * | 11/2010 | Forster | ..................... | A61C 7/10 433/7 |
| 8,821,156 B2 | 9/2014 | Ehrenberger et al. | | |
| 2004/0152033 A1 * | 8/2004 | Collins, Jr. | .............. | A61C 7/10 433/7 |
| 2007/0218416 A1 * | 9/2007 | Keles | ....................... | A61C 7/10 433/7 |
| 2007/0275341 A1 * | 11/2007 | Hanks | ...................... | A61C 7/10 433/7 |
| 2008/0072915 A1 * | 3/2008 | Nelissen | ................. | A61F 5/566 128/848 |

(Continued)

FOREIGN PATENT DOCUMENTS

| | | | | |
|---|---|---|---|---|
| DE | 4125853 A1 * | 2/1993 | ............... | A61C 7/10 |
| DE | 20010279 U1 * | 8/2000 | ............... | A61C 7/10 |

(Continued)

*Primary Examiner* — Jacqueline T Johanas
*Assistant Examiner* — Holly T. To
(74) *Attorney, Agent, or Firm* — Hackler Daghighian Martino & Novak (57) ABSTRACT

An orthodontic expansion screw including at least two bodies, the mutual distance between which can be changed by means of a spindle, and with one or two guide pins, which engage both bodies and guide them while preventing a relative rotation of the bodies given a change in their distance relative to each other. In order to prevent or impede an inadvertent twisting of the spindle relative to the bodies, the outer periphery of the activating part has a shell surface, whose configuration differs from a shell surface of a circular cylinder in such a way that there is at least one first position of the spindle in which the activating part contacts the guide pins with a pressure that leads to an elastic deformation of a guide pin.

14 Claims, 8 Drawing Sheets

(56) References Cited

U.S. PATENT DOCUMENTS

| | | | | |
|---|---|---|---|---|
| 2010/0112507 A1* | 5/2010 | Ehrenberger | ............ | A61C 7/10 |
| | | | | 433/7 |
| 2015/0024333 A1* | 1/2015 | Montalban | ............... | A61C 7/10 |
| | | | | 433/7 |
| 2015/0024334 A1* | 1/2015 | Montalban | ............... | A61C 7/10 |
| | | | | 433/7 |
| 2017/0209239 A1* | 7/2017 | Showkatbakhsh | ....... | A61C 7/10 |
| 2017/0354482 A1* | 12/2017 | Kim | ......................... | A61C 7/10 |
| 2018/0110592 A1* | 4/2018 | Kanaan | ..................... | A61C 7/10 |

FOREIGN PATENT DOCUMENTS

| | | | | |
|---|---|---|---|---|
| DE | 10 2007 002 040 A1 | | 7/2008 | |
| DE | 10 2008 057 224 A1 | | 5/2010 | |
| EP | 0929268 B1 * | | 1/2002 | ............... A61C 7/10 |
| EP | 1787600 A1 * | | 5/2007 | ............... A61C 7/10 |
| FR | 3056393 A1 * | | 3/2018 | ............... A61C 7/10 |
| KR | 20060086753 A * | | 8/2006 | |
| KR | 101671730 B1 * | | 11/2016 | ............... A61C 7/10 |
| KR | 101726590 B1 * | | 4/2017 | ............... A61C 7/10 |
| KR | 20180055168 A * | | 5/2018 | |
| WO | WO-03071976 A1 * | | 9/2003 | ............... A61C 7/10 |
| WO | WO-2007120119 A2 * | | 10/2007 | ......... A61B 17/8872 |
| WO | 2012 120447 A1 | | 9/2012 | |
| WO | WO-2017174929 A1 * | | 10/2017 | ............... A61C 7/10 |
| WO | WO-2017188899 A1 * | | 11/2017 | ............... A61C 7/10 |

\* cited by examiner

ORTHODONTIC EXPANSION SCREW

CROSS-REFERENCE TO RELATED APPLICATION

This application claims priority to DE 10 2019 115 019.1 filed on Jun. 4, 2019, the contents of which is fully incorporated herein with these references.

DESCRIPTION

Field of the Invention

The invention proceeds from an orthodontic expansion screw comprising at least two bodies, arranged at a mutual distance of each other which can be changed by means of a spindle that engages both bodies, wherein the spindle comprises an activating part from which at least one threaded part proceeds that engages a threaded hole in one of the two bodies so that the spindle and the threaded hole have a common longitudinal axis, said orthodontic expansion screw additionally comprising two mutually parallel guide pins, which engage both bodies and guide them while preventing a relative rotation of the bodies upon a change in their distance relative to each other, wherein the spindle is arranged between the guide pins, and the shared longitudinal axis runs parallel to the two guide pins.

BACKGROUND OF THE INVENTION

An expansion screw is disclosed in U.S. Pat. No. 7,837,465 B2.

In order to hinder inadvertently twisting the spindle, its activating part in the known expansion screw has an outer cross section that deviates from a circular shape. A metal strip presses on the activating part in a radial direction, and in so doing acts as a friction brake for the spindle. This friction brake holds the spindle in angular positions in which the metal strip assumes the least distance from the longitudinal axis of the spindle, since the shape of the activating part deviates from that of a circle. In the known expansion screw, the ends of the metal strip are fastened to the two guide pins, in particular welded thereto. The metal strip creates an obstruction for the spindle. However, the disadvantage to this type of obstruction is that it requires a separate component that must be fastened to the cylindrical guide pins.

U.S. Pat. No. 7,837,465 B2 also discloses an obstruction by slightly pinching the female thread of the expansion screw body into which a threaded portion of the spindle engages. While this does avoid a separate component, the disadvantage is that the extent of the pinching generated in this way can only be reproduced with difficulty, thus resulting in significant differences in pinching within a series of expansion screws.

It may be one of many objects of the present invention to provide a way in which a readily reproducible obstruction of the spindle in predefined rotational positions of the spindle can be realized in the orthodontic expansion screw, without requiring a separate component for this purpose.

SUMMARY OF THE INVENTION

A first solution according to the present invention is achieved by an orthodontic expansion screw having the features indicated in claim 1. A second solution according to the present invention based on the same principle is indicated in claim 2. Advantageous further refinements of the invention are the subject of the dependent claims.

The solution according to claim 1 achieves a well-defined obstruction of the spindle without a separate component, and avoids the outlay otherwise incurred for its assembly. The expansion screw according to this embodiment of the invention has a spindle whose activating part has a lateral surface, the shape of which deviates from the lateral surface of a circular cylinder in such a way that the radius of the activating part of the spindle as measured from the longitudinal axis of the spindle is not constant, but rather varies in its circumferential direction, specifically in such a way that the activating part exerts a pressure of varying strength on the two guide pins during the course of a complete revolution of the spindle. Compared to the expansion screw disclosed in U.S. Pat. No. 7,837,465 B2 an obstruction of rotation of the spindle is thereby achieved in that the distance between the activating part of the spindle and the two guide pins is reduced to such an extent that the section of the activating part with the largest radius can only be moved past the guide pin facing it by pressing on the guide pin as the spindle rotates, and pushing it away from itself during rotation. The force needed therefor is so large that inadvertent rotation of the spindle is very unlikely. If the section of the activating part with the largest radius has been moved past the guide pin that faces it, there is a circumferential section of the activating part facing the guide pin that has a smaller distance from the longitudinal axis of the spindle, so that the guide pin can relax. Thus the guide pin can move from an elastically bent configuration back into its original configuration. In this way, when the spindle is continuously turned, it alternately runs through a first position, which it can only assume given the elastic deformation of one or both guide pins, and a second position, which is "stabilized" in the sense that the spindle can only exit this second position and be turned into its first position if a torque is applied that is large enough to elastically deform one or both guide pins. The designation of the second position as "stabilized" is not intended to rule out an ability of the spindle to be turned by a limited angle in this position, before it is obstructed during the rotation as it increasingly presses on one or both guide pins.

If the periphery of the activating part has only a single section with an enlarged distance from the longitudinal axis of the spindle, the spindle gets into a stabilized location twice during each complete revolution. If the aim is to stabilize the position of the spindle in more than two positions per revolution, several changes between a larger and smaller distance of the lateral surface of the spindle from its longitudinal axis must be provided on the periphery of its activating part.

The solution indicated in claim 2 differs from the solution indicated in claim 1 in that the expansion screw only has a single guide pin running parallel to the spindle, which interacts with the spindle in order to linearly guide the two expansion screw bodies, when their mutual distance is changed by turning the spindle.

In an embodiment of the invention, the configuration of the lateral surface of the activating part of the spindle may deviate from the lateral surface of a circular cylinder in such a way that the lateral surface of the activating part is flattened in two places. At least when a flattened region of the spindle faces each guide pin, the spindle is in a stabilized position.

The configuration of the lateral surface of the activating part may deviate from the lateral surface of a circular cylinder in such a way that the lateral surface of the activating part is flattened in two places diametrically opposed to each other. Then an expansion screw with two guide pins as well as an expansion screw with only one guide pin, the spindle can here be moved from a stabilized position into the next stabilized position by a half turn.

In another embodiment, the configuration of the lateral surface of the activating part deviates from the shell surface of a circular cylinder in such a way that the activating part of the spindle has two pairs of flattened regions lying diametrically opposite each other to provide four stabilized positions. Therein the pairs of flattened regions are offset relative to each other by 90° in the circumferential direction of the activating part. In this way, each complete revolution of the spindle enables four stabilized positions of the spindle, which are offset relative to each other by 90°.

If the expansion screw has only a single guide pin, and the spindle has only a single flattened region, the spindle only assumes a single stabilized position during each complete revolution.

Two radially running through holes may be provided in the activating part of the spindle, said through holes cross or intersect each other at a right angle. A pin can be introduced into such cross holes, and used to incrementally turn the spindle. The location of cross holes may be selected in such a way that the mouths of the cross holes lie at least partially, or completely, between two respective flattened regions. The activating part of the spindle is particularly designed as a square with rounded edges, wherein the cross holes are provided in the rounded edges. The rounded edges can have the contour of a circular arc section, whose radius forms the largest radius of the activating part.

The invention is particularly suitable for expansion screws whose spindle has two threaded parts, which extend in opposite directions away from the activating part. However, the invention is also suitable for expansion screws in which the spindle has only a single treaded part extending from the activating part.

It is possible that the device provided for preventing or impeding the twisting of the spindle is active in both rotational directions of the spindle. It is particularly suitable for expansion screws that have two guide pins, between which the spindle is arranged. The longitudinal axes of the two guide pins and the spindle here may lie in a common geometrical plane. However, the invention is also suitable for expansion screws in which only a single guide pin is provided apart from the spindle, which interacts with the spindle to prevent the two bodies of the expansion screw from twisting relative to each other.

The guide pins of the expansion screw may be cylindrical in design. However, other cross sectional shapes are also possible for the guide pins, e.g., square or rectangular cross sections. But cylindrical guide pins are particularly suitable for expansion screws according to the invention, and facilitate the cheap manufacture of expansion screws.

BRIEF DESCRIPTION OF THE DRAWINGS

Illustrative embodiments of the expansion screw according to the invention are shown in the attached drawings. Identical or correlating parts of the expansion screws are designated with consistent reference numbers in the embodiments.

DETAILED DESCRIPTION OF THE PREFERRED EMBODIMENTS

The expansion screw shown on FIGS. 1 to 12 has two bodies 1 and 2, whose distance relative to each other can be changed by means of a spindle 3, which has a central activating part 4, from which two threaded parts 7, 8 with opposite winding directions proceed in a direction opposite each other. The bodies 1 and 2 may be identically designed. The first threaded part 7 is rotatably mounted in the first body 1, and the second threaded part 8 in the second body 2. To this end, each of the two bodies 1 and 2 has a threaded through hole 11, into which one of the two respective threaded parts 7 and 8 is inserted. Accordingly, the two threaded holes 11 align with each other, and have an opposite winding direction corresponding to the two threaded parts 7 and 8. The threads in the two threaded parts 7 and 8 and in the threaded holes 11 have the same pitch.

Figures 1, 3:
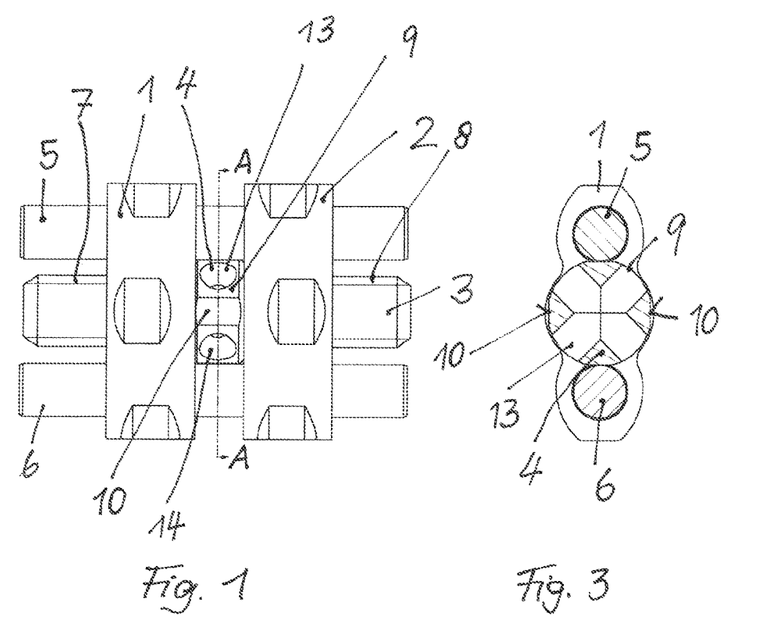
FIG. 1 shows a top view of an expansion screw comprising two guide pins and a spindle with two threaded parts proceeding from an activating part, with the spindle in a stabilized position, wherein the activating part has four flattened regions.
FIG. 3 shows section A-A of the expansion screw depicted on FIG. 1.
Figure 2:
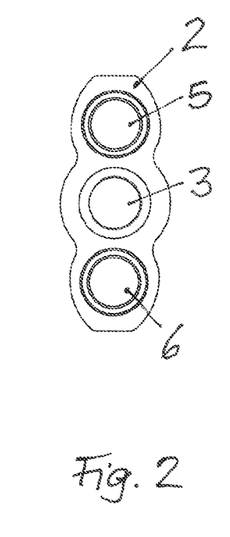
FIG. 2 shows a view of the right end of the expansion screw on FIG. 1.
Figure 4:
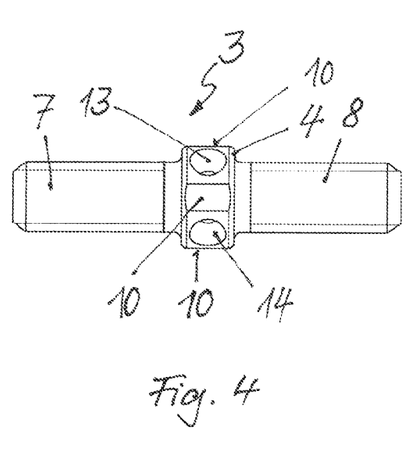
FIG. 4 shows the spindle of the expansion screw from FIG. 1 as an individual part, in a top view as in FIG. 1.
Figure 5:
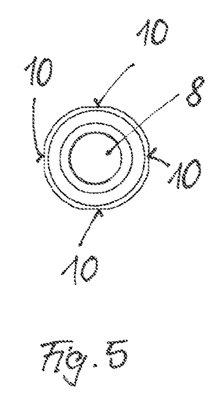
FIG. 5 shows a view of the right end of the spindle in FIG. 4.
Figure 6:
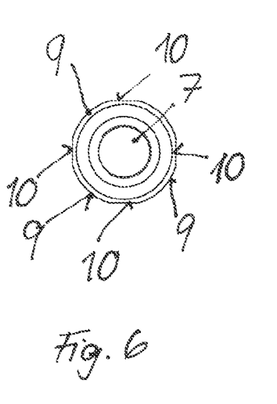
FIG. 6 shows a view of the left end of the spindle in FIG. 4.
Figure 7:
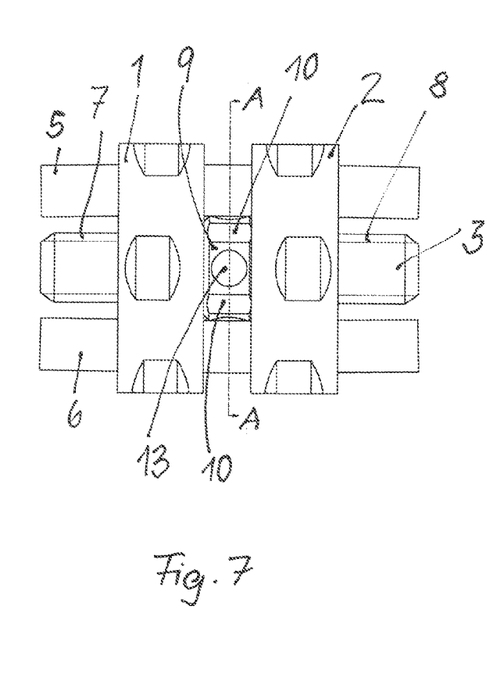
FIG. 7 shows the expansion screw of FIG. 1, with the spindle in a position in which it has been turned to the front or back by one fourth of a revolution relative to a stabilized position.
Figure 8:
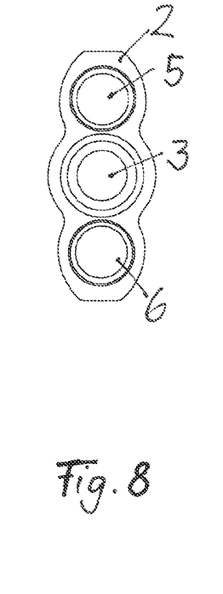
FIG. 8 shows the view of the right end of the expansion screw in FIG. 7.
Figure 9:
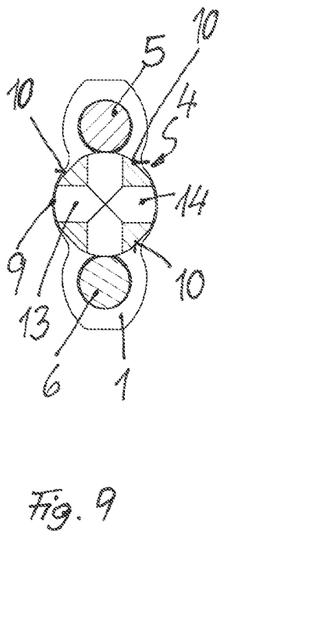
FIG. 9 shows section A-A of the expansion screw of FIG. 7.
Figure 10:
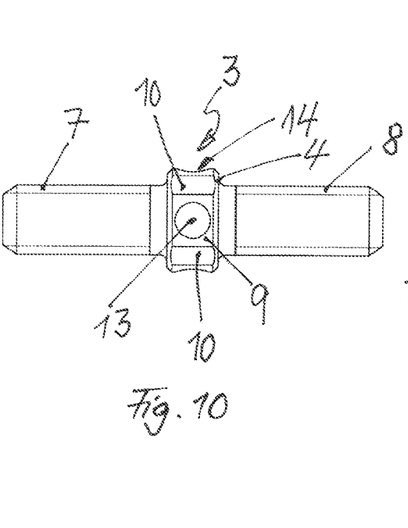
FIG. 10 shows the spindle of the expansion screw of FIG. 7 as an individual part, in a top view as in FIG. 7.
Figure 11:
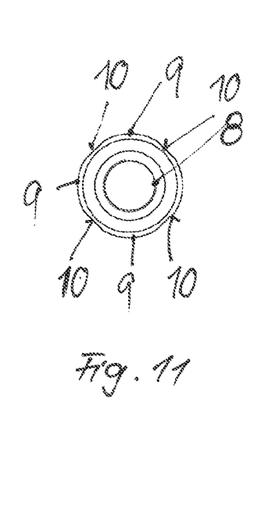
FIG. 11 shows a view of the right end of the spindle in FIG. 10.
Figure 12:
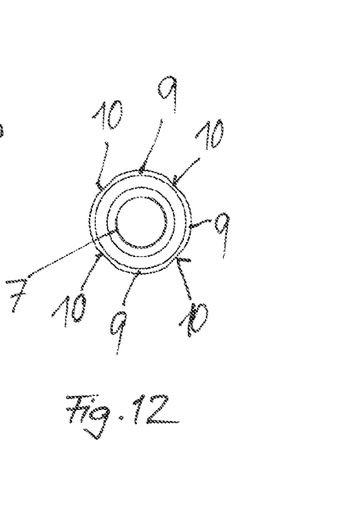
FIG. 12 shows a view of the left end of the spindle in FIG. 10.
Figure 13:
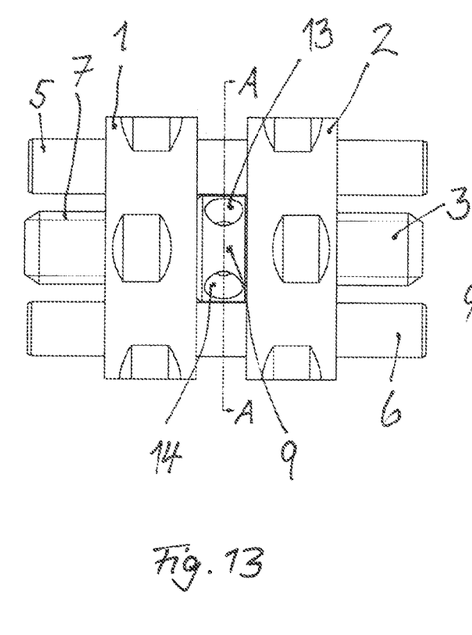
FIGS. 13 to 24, in illustrations corresponding to FIGS. 1 to 12, show expansion screws that differ from the expansion screw depicted on FIGS. 1 to 12 in that the activating part of the spindle has only two flattened regions facing diametrically away from each other.
Figure 14:
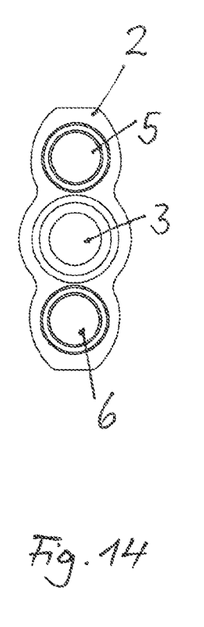
Figure 15:
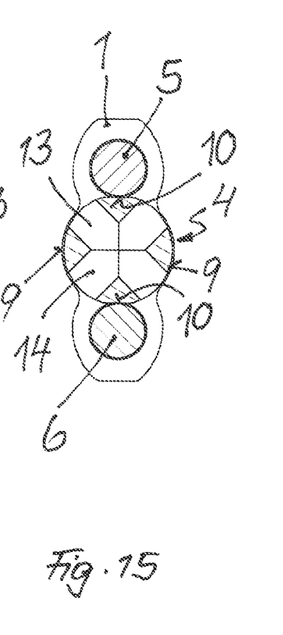
Figure 16:
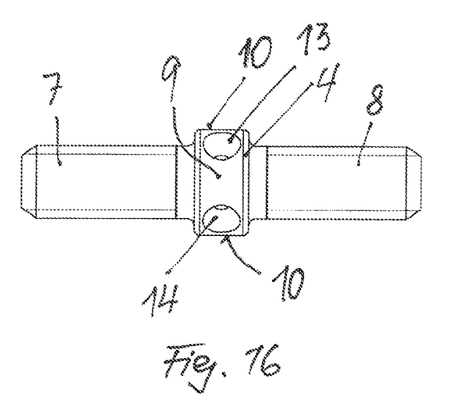
Figure 17:
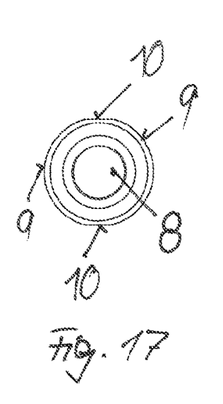
Figure 18:
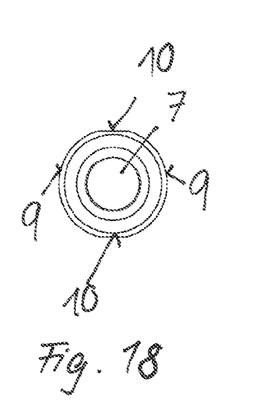
Figure 19:
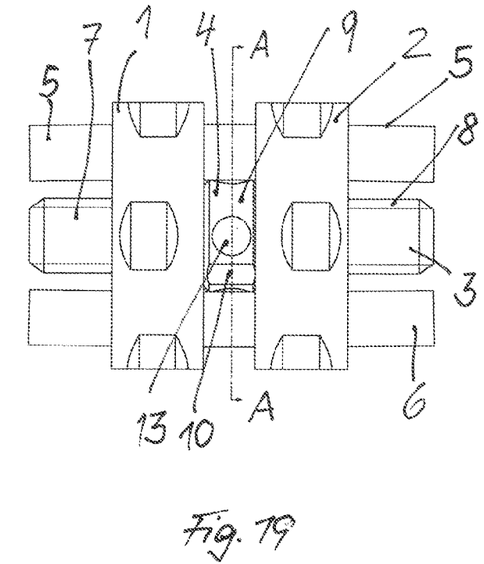
Figure 20:
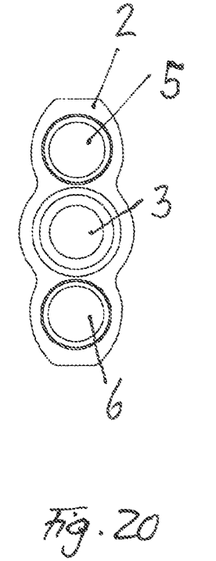
Figure 21:
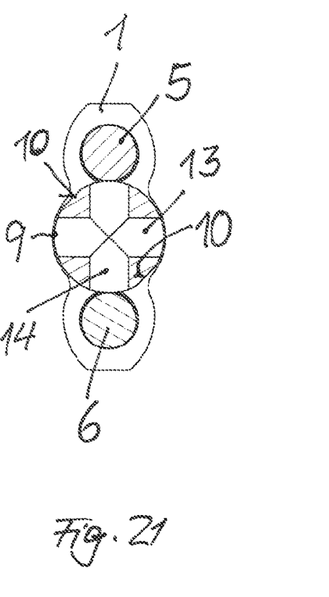
Figure 22:
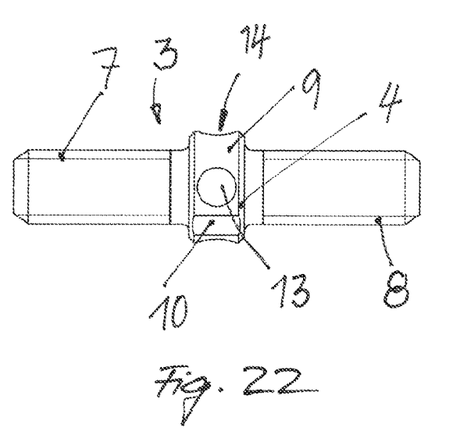
Figure 23:
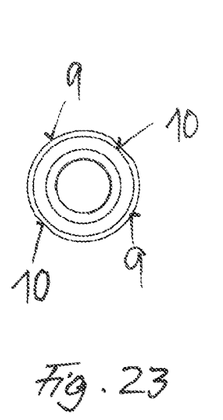
Figure 24:
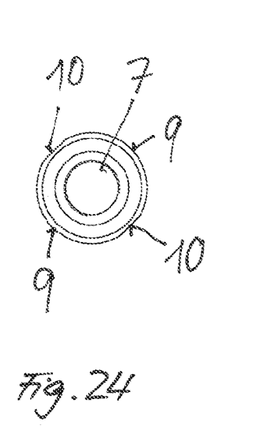
Figures 25, 27:
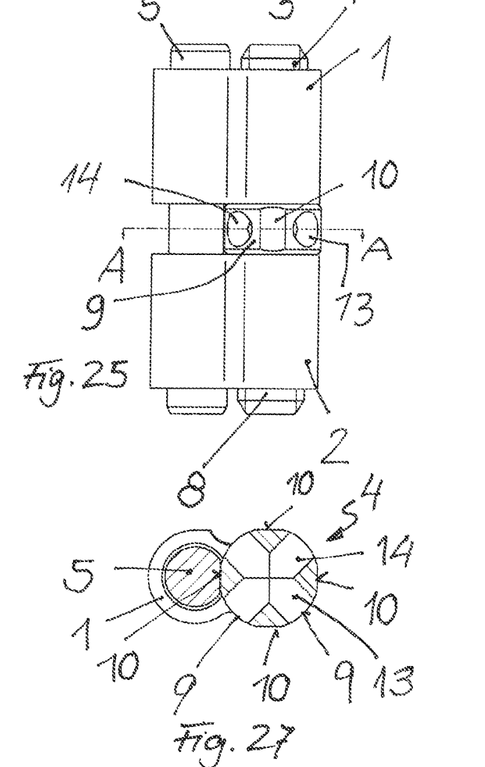
FIG. 25 shows an expansion screw comprising only one guide pin, in a top view corresponding to FIG. 1, with the spindle in a stabilized position and with an activating part 4, which has four flattened regions as in FIG. 1.
FIG. 27 shows section A-A of the expansion screw of FIG. 25.
Figure 26:
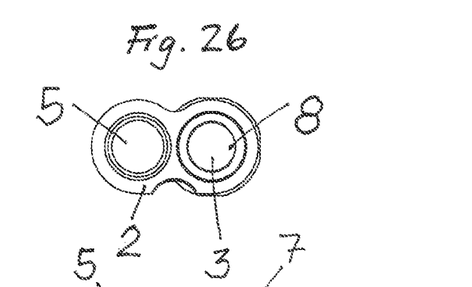
FIG. 26 shows a view of the lower end of the expansion screw in FIG. 25.
Figure 28:
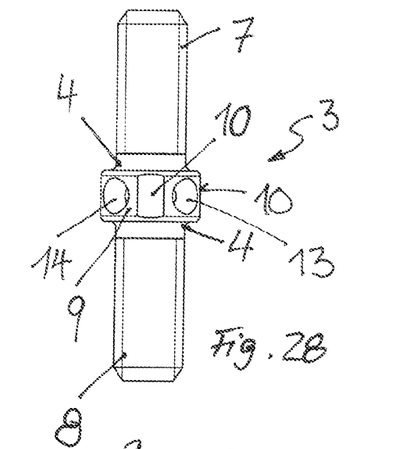
FIG. 28 shows the spindle of the expansion screw of FIG. 25 as an individual part, in a top view as in FIG. 25.
Figure 29:
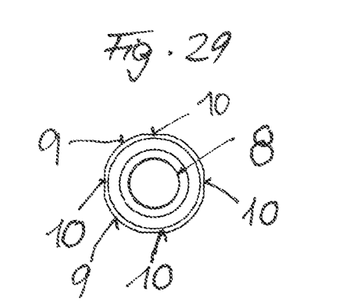
FIG. 29 shows a view of the lower end of the spindle in FIG. 28.
Figure 30:
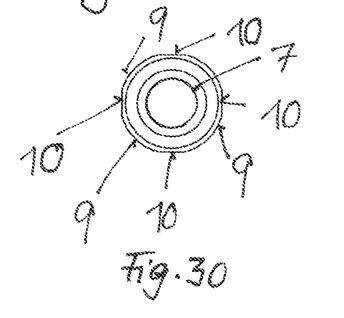
FIG. 30 shows a view of the upper end of the spindle in FIG. 28.
Figure 31:
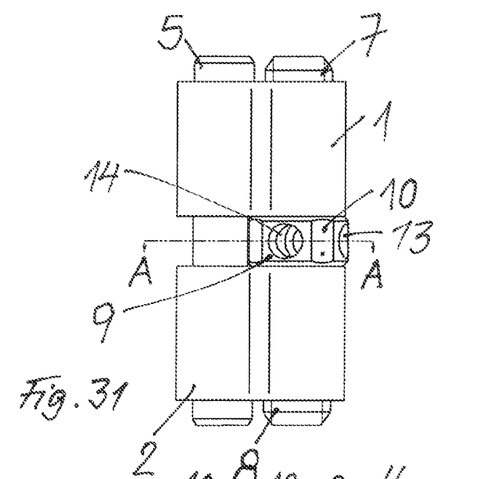
FIG. 31 shows the expansion screw of FIG. 25, with the spindle in a position in which it has been turned to the front or back by one fourth of a revolution relative to a stabilized position.
Figure 32:
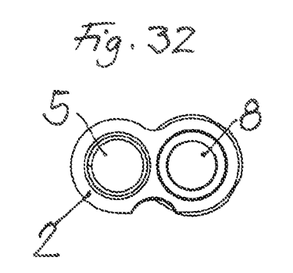
FIG. 32 shows a view of the lower end of the expansion screw in FIG. 31.
Figure 33:
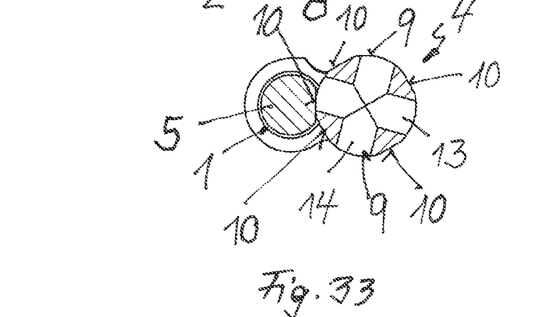
FIG. 33 shows section A-A of the expansion screw of FIG. 31.
Figure 34:
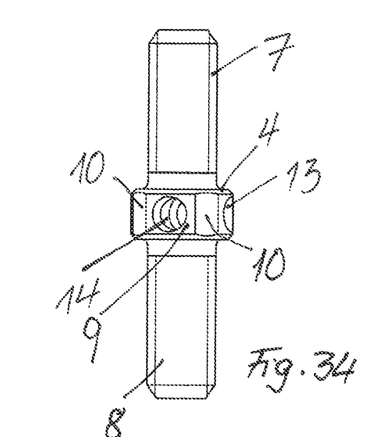
FIG. 34 shows the spindle of the expansion screw of FIG. 31 as an individual part, in a top view as in FIG. 31.
Figure 35:
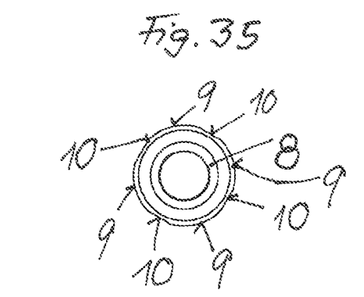
FIG. 35 shows a view of the lower end of the spindle in FIG. 34.
Figure 36:
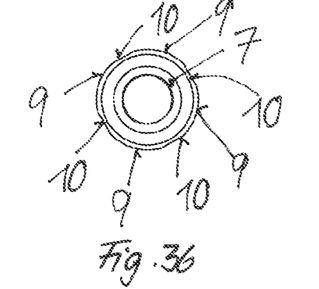
FIG. 36 shows a view of the upper end of the spindle in FIG. 34.
Figure 37:
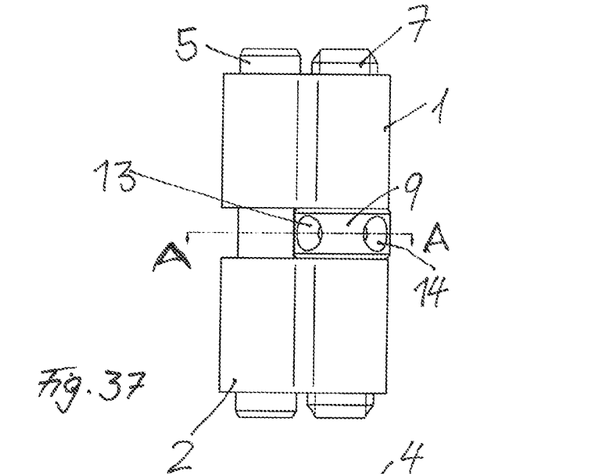
FIG. 37 shows a top view of an expansion screw as in FIG. 25, but with only two flattened regions on the activating part of the spindle.
Figure 38:
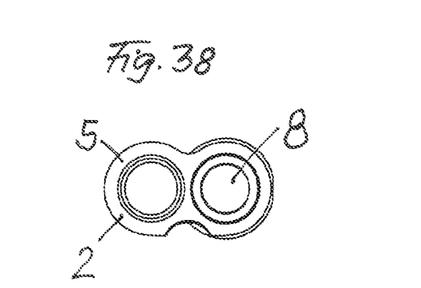
FIG. 38 shows a view of the lower end of the expansion screw in FIG. 37.
Figure 39:
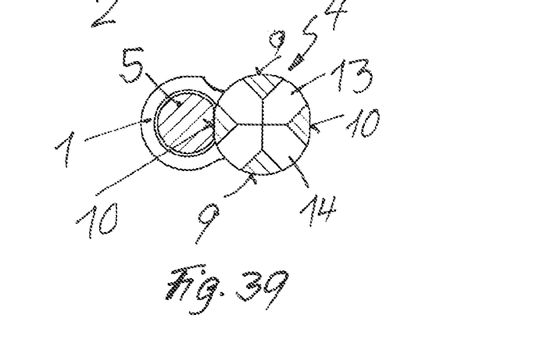
FIG. 39 shows section A-A through the expansion screw of FIG. 37.
Figure 40:
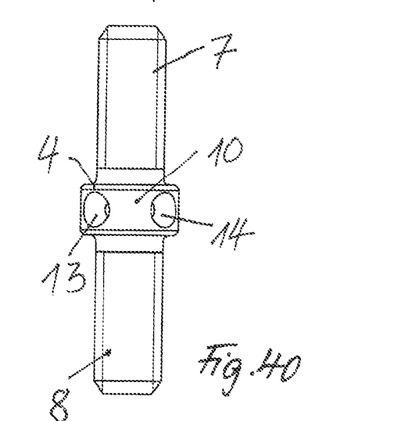
FIG. 40 shows the spindle of the expansion screw of FIG. 37 as an individual part, in a top view as in FIG. 37.
Figure 41:
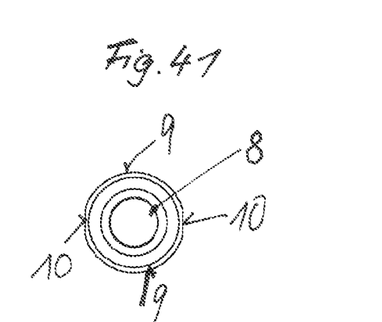
FIG. 41 shows a view of the lower end of the spindle in FIG. 40.
Figure 42:
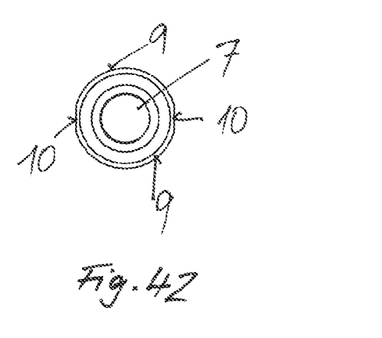
FIG. 42 shows a view of the upper end of the spindle in FIG. 40.
Figure 43:
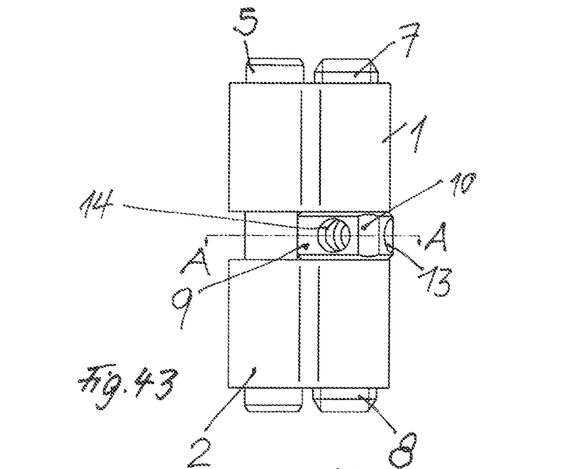
FIG. 43 shows the expansion screw of FIG. 37, with the spindle in a position in which it has been turned by one fourth of a revolution relative to a stabilized position.
Figure 44:
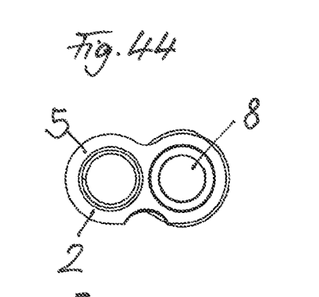
FIG. 44 shows a view of the lower end of the expansion screw in FIG. 43.
Figure 45:
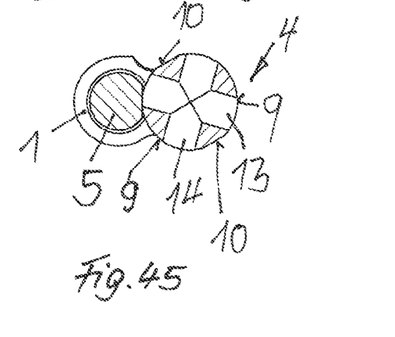
FIG. 45 shows a view of the upper end of the expansion screw in FIG. 43.
Figure 46:
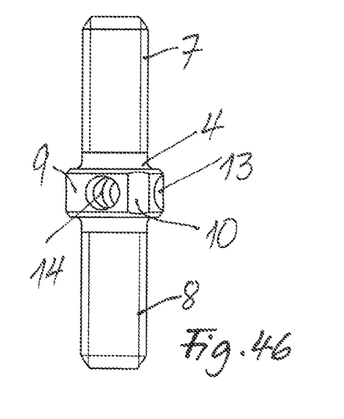
FIG. 46 shows the spindle of the expansion screw of FIG. 43 as an individual part, in a top view as in FIG. 43.
Figure 47:
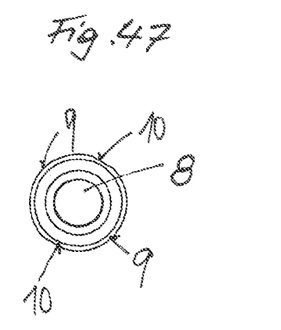
FIG. 47 shows a view of the lower end of the spindle in FIG. 46.
Figure 48:
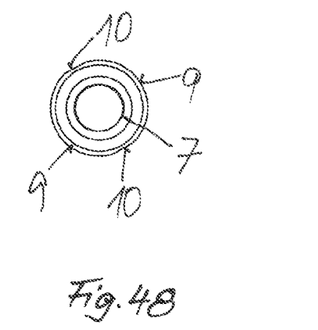
FIG. 48 shows a view of the upper end of the spindle in FIG. 46.

Provided on both sides of the spindle 3 are two cylindrical guide pins 5 and 6, which run parallel to each other and parallel to the spindle 3, and are inserted into matching, aligned pairs of through holes of the two bodies 1 and 2. The guide pins 5 and 6 are linear guiding means, which guide the two bodies 1 and 2 along two guide axes that are parallel to each other, preventing a relative rotation of the two bodies 1 and 2 during a change in their distance relative to each other.

In all embodiments, the activating part 4 has two through holes 13 and 14 that intersect each other at a right angle. In order to turn the spindle 3, an adjusting tool, for example a pin, can be inserted into holes 13 or 14, which can then be used as a lever for turning the spindle 3. Turning the activating part 4 changes the distance between the two bodies 1 and 2, which then glide on the guide pins 5 and 6, so that the two bodies 1 and 2 are linearly guided, and a rotation of the two bodies 1 and 2 relative to each other is prevented.

To prevent the expansion screw from expanding by itself in the mouth of a patient, a device is formed in the expansion screw that prevents or at least impedes an inadvertent rotation of the spindle 3 relative to the two bodies 1, 2 in both rotational directions of the spindle 3. For this purpose, the activating part 4 has a lateral surface 9 that is interrupted by the four openings of the two through holes 13 and 14. The activating part 4 is flattened between the four openings of the cross holes 13 and 14, so that a total of four flattened regions 10 are present in the first embodiment. The flattened regions 10 are flat, but may also have a slight curvature. As shown in FIG. 1, they may reach as far as the edge of the through holes 13 and 14, but also end at a distance from them. They need not be flat surfaces, but rather can also be curved, wherein the diameter of the activating part 4 in the area of the flattened regions 10 must at any rate be smaller than the diameter of the cylindrical part of the lateral surface 9 of the activating part 4.

The diameter of the cylindrical part of the lateral surface 9 of the activating part 4 is larger than the distance between the two guide pins 5 and 6. At least in the center of the flattened regions 10, the diameter of the activating part 4 measured between the flattened regions 10 facing away from each other is no greater than the distance between the two guide pins 5 and 6 when the latter are in a relaxed state, which characterizes the stabilized positions of the spindle 3.

FIGS. 1 to 3 show the expansion screw with the spindle 3 in a stabilized position. The term "second position" of the spindle 3 is herein used within the meaning of the claims. Two flattened regions 10 that face diametrically away from each other face the guide pins 5 and 6 in this second position. Since the mutual distance between the two flattened regions 10 facing away from each other is not larger in this position than the mutual distance between the two cylindrical guide pins 5 and 6 in their relaxed state, the flattened regions 10 exert no force on the guide pins 5 and 6. They may touch the two guide pins 5 and 6 without pressure. When the spindle 3 is turned to the right or to the left, a section of the activating part 4 with a larger diameter comes into contact with the two guide pins 5 and 6, as a result of which the activating part 4 of the spindle 3 acts with an increasing force on the two guide pins 5 and 6, which reaches its maximum when the activating part 4 contacts the guide pins 5 and 6 with circularly curved sections of its lateral surface 9, elastically deforming the latter, if only slightly. Within the meaning of the claims, this position is the "first" position of the spindle 3. The force necessary to overcome it is determined by the dimensions selected for the activating part 4 and by the sizing and arrangement of the guide pins 5 and 6, and chosen in such a way as to prevent or at least impede an inadvertent displacement of the spindle 3 out of one locked position into the next locked position.

Each quarter turn of the spindle 3 of the expansion screw depicted in FIGS. 1 to 3 brings the spindle 3 from a "second" position, in which the position of the spindle 3 is stabilized, into the next "second" stabilized position, and in so doing overcomes a "first" position within the meaning of the claims, in which the guide pins 5 and 6 press against the activating part 4 with an elastic restoring force.

The second embodiment of the expansion screw depicted in FIGS. 13 to 24 differs from the first embodiment depicted on FIGS. 1 to 12 in that the activating part 4 of the spindle 3 only has two flattened regions 10 facing diametrically away from each other. As a consequence, there are not four, but rather only two "second" positions for this expansion screw during the course of each full turn of the spindle 3, in which the location of the spindle 3 is stabilized. Between the two flattened regions 10, the activating part 4 of the spindle 3 has a surface, which is part of a cylindrical shell surface that is interrupted by the holes 13, 14 and extends over a larger circumferential angle than in the first embodiment.

The two guide pins 5 and 6 do not necessarily have to be present in an expansion screw according to the invention. In principle, suitable linear guiding means can be formed by the spindle 3 itself and a single guide pin 5 that is parallel to the spindle 3.

The third embodiment of an expansion screw depicted on FIGS. 25 to 36 differs from the expansion screw depicted in FIGS. 1 to 12 in that it only has one guide pin 5. In this case, the two bodies 1 and 2 are linearly guided while the spindle 3 is turned via the interaction between the spindle 3 and the single guide pin 5. As in the first embodiment, the spindle 3, whose activating part 4 has four flattened regions 10, is moved from a stabilized "second" position into the next stabilized "second" position by a quarter turn, wherein the forces to be overcome in the process are together absorbed by the activating part 4 of the spindle 3 and the single guide pin 5.

In this embodiment, the bodies 1 and 2 are longer than in the first and second embodiments in order to balance out the omission of the one guide pin in a way that improves the linear guidance.

The fourth embodiment depicted on FIGS. 37 to 48 only differs from the third embodiment depicted on FIGS. 25 to 36 in that the activating part 4 of the spindle 3 only has two flattened regions facing diametrically away from each other, so that there are two positions in which the location of the spindle 3 is stabilized during the course of a complete revolution of the spindle 3.

Instead of a spindle 3 with two threaded parts 7 and 8, a spindle with just a single threaded part may also be used in expansion screws according to the invention. In this case, the spindle is only turned into a threaded hole in one of the two bodies, and rotatably, but immovably, connected with the other body of the expansion screw, in particular by virtue of rotatably mounting the activating part of the spindle in a chamber of one of the two bodies of the expansion screw, wherein the single threaded part of the spindle protrudes out of this chamber, and is turned into the threaded hole of the other body of the expansion screw.

REFERENCE NUMERALS

1 Body
2 Body
3 Spindle
4 Activating part
5 Guide pin
6 Guide pin
7 First threaded part
8 Second threaded part
9 Shell surface
10 Flattened region
11 Threaded hole
12 -
13 Through hole
14 Through hole

What is claimed is:

1. An orthodontic expansion screw, comprising:
    at least two bodies arranged at a mutual distance that can be changed by means of a spindle, which engages both bodies, wherein the spindle comprises an activating part, from which at least one threaded part proceeds into a threaded hole in one of the two bodies, wherein the spindle and the threaded hole have a shared longitudinal axis;
    two mutually parallel guide pins, which engage both bodies and guide them while preventing a relative rotation of the bodies upon a change in their distance relative to each other, wherein the spindle is arranged between the guide pins, and the shared longitudinal axis runs parallel to the two guide pins;
    wherein the outer periphery of the activating part has a lateral surface, whose configuration differs from a lateral surface of a circular cylinder where there is at least one first position of the spindle in which the activating part presses against the guide pins causing an elastic deformation of at least one of the two guide pins, and that there is at least one second position of the spindle in which the activating part does not elastically deform the guide pins;
    wherein radially running through holds are provided in the activating part, which cross or intersect each other at a right angle;
    wherein the through holes each start and end between two flattened regions of the activating part; and
    wherein the activating part is designed as a square with circularly rounded edges, wherein the through holes longitudinally run from one of the circularly rounded edges to another.

2. The orthodontic expansion screw according to claim 1, wherein the configuration of the lateral surface of the activating part differs from the lateral surface of a circular cylinder wherein the lateral surface of the activating part that faces the guide pin in the second position is flattened.

3. The orthodontic expansion screw according to claim 1, wherein the configuration of the lateral surface of the activating part differs from the lateral surface of a circular cylinder wherein the lateral surface of the activating part is flattened at two locations facing diametrically away from each other.

4. The orthodontic expansion screw according to claim 1, wherein the configuration of the lateral surface of the activating part differs from the lateral surface of a circular cylinder wherein the activating part has two pairs of flattened regions arranged diametrically opposite each other such that there are four second positions, wherein the pairs are offset relative to each other by 90° in the circumferential direction of the activating part.

5. The orthodontic expansion screw according to claim 1, wherein the spindle comprises two threaded parts, which extend in opposite directions proceeding from the activating part.

6. The orthodontic expansion screw according to claim 1, wherein the spindle only has a single threaded part, which proceeds from the activating part.

7. The orthodontic expansion screw according to claim 1, wherein inadvertent turning of the spindle is prevented or impeded both rotational directions of the spindle.

8. An orthodontic expansion screw, comprising:
    at least two bodies arranged at a mutual distance that can be changed by means of a spindle, which engages both bodies, wherein the spindle comprises an activating part, from which at least one threaded part proceeds into a threaded hole in one of the two bodies, so that the spindle and the threaded hole have a shared longitudinal axis;
    one guide pin, which engages both bodies and guides them while preventing a relative rotation of the bodies upon a change of their distance relative to each other, wherein the shared longitudinal axis runs parallel to the guide pin;
    wherein the outer periphery of the activating part has a lateral surface, whose configuration differs from a lateral surface of a circular cylinder wherein there is at least one first position of the spindle in which the activating part presses against the guide pin causing an elastic deformation of the guide pin, and that there is at least one second position of the spindle in which the activating part does elastically deform the guide pin;
    wherein radially running through holes are provided in the activating part, which cross or intersect each other at a right angle;

wherein the through holes each start and end between two flattened regions of the activating part;

wherein the activating part is designed as a square with circularly rounded edges, wherein the through holes longitudinally run from one of the circularly rounded edges to another.

9. The orthodontic expansion screw according to claim 8, wherein the configuration of the lateral surface of the activating part differs from the lateral surface of a circular cylinder wherein the lateral surface of the activating part that faces the guide pin in the second position is flattened.

10. The orthodontic expansion screw according to claim 8, wherein the configuration of the lateral surface of the activating part differs from the lateral surface of a circular cylinder wherein the lateral surface of the activating part is flattened at two locations facing diametrically away from each other.

11. The orthodontic expansion screw according to claim 8, wherein the configuration of the lateral surface of the activating part differs from the lateral surface of a circular cylinder wherein the activating part has two pairs of flattened regions arranged diametrically opposite each other such that there are four second positions, wherein the pairs are offset relative to each other by 90° in the circumferential direction of the activating part.

12. The orthodontic expansion screw according to claim 8, wherein the spindle comprises two threaded parts, which extend in opposite directions proceeding from the activating part.

13. The orthodontic expansion screw according to claim 8, wherein the spindle only has a single threaded part, which proceeds from the activating part.

14. The orthodontic expansion screw according to claim 8, wherein inadvertent turning of the spindle is prevented or impeded both rotational directions of the spindle.

* * * * *

UNITED STATES PATENT AND TRADEMARK OFFICE
CERTIFICATE OF CORRECTION

| | |
|---|---|
| PATENT NO. | : 11,389,274 B2 |
| APPLICATION NO. | : 16/946044 |
| DATED | : July 19, 2022 |
| INVENTOR(S) | : Michael Regelmann |

It is certified that error appears in the above-identified patent and that said Letters Patent is hereby corrected as shown below:

In the Claims

Column 8, Claim 1, Line 6, "holds" should read --holes--.

Signed and Sealed this
Thirtieth Day of August, 2022

Katherine Kelly Vidal
*Director of the United States Patent and Trademark Office*